United States Patent
Yamasaki

(10) Patent No.: US 6,623,891 B2
(45) Date of Patent: Sep. 23, 2003

(54) POLYMER ELECTROLYTE BATTERY OF HIGH MECHANICAL STRENGTH AND HIGH HEAT RESISTANCE, AND METHOD FOR PRODUCING THE POLYMER ELECTROLYTE BATTERY

(75) Inventor: Mikiya Yamasaki, Sumoto (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 349 days.

(21) Appl. No.: 09/815,009

(22) Filed: Mar. 23, 2001

(65) Prior Publication Data

US 2001/0024756 A1 Sep. 27, 2001

(30) Foreign Application Priority Data

Mar. 27, 2000 (JP) ......................................... 2000-087627

(51) Int. Cl.[7] ...................... H01M 10/40; H01M 6/16; H01M 6/18
(52) U.S. Cl. ...................... 429/303; 429/127; 429/129; 429/232; 429/236
(58) Field of Search ...................... 429/127, 189, 429/232, 236, 247, 248, 94, 217, 303, 309; 29/623.1–623.5

(56) References Cited

U.S. PATENT DOCUMENTS

| | | | |
|---|---|---|---|
| 4,303,748 A | 12/1981 | Armand et al. | 429/192 |
| 4,357,401 A | 11/1982 | Andre et al. | 429/192 |
| 4,849,311 A | 7/1989 | Itoh et al. | 429/192 |
| 6,423,447 B1 * | 7/2002 | Ohsaki et al. | 429/217 |
| 6,465,125 B1 * | 10/2002 | Takami et al. | 429/127 |

FOREIGN PATENT DOCUMENTS

JP        05-003036      1/1993

\* cited by examiner

Primary Examiner—Randy Gulakowski
Assistant Examiner—Gentle E. Winter
(74) Attorney, Agent, or Firm—Armstrong, Westerman & Hattori, LLP

(57) ABSTRACT

A polymer electrolyte battery having a high discharge capacity, a high mechanical strength, and a high heat resistance is provided. This polymer electrolyte battery includes: a polymer electrolyte layer 51 covering an edge face 20a of a positive electrode plate 20 and an edge part 40b of a porous membrane 40; a polymer electrolyte layer 52 covering an edge face 30a of a negative electrode plate 39 and an edge part 40c of the porous membrane 40; and a polymer electrolyte layer 53 covering an edge face 40a of the porous membrane 40 in a manner that connects the polymer electrolyte layer 51 with the polymer electrolyte layer 52.

12 Claims, 3 Drawing Sheets

POLYMER ELECTROLYTE BATTERY OF HIGH MECHANICAL STRENGTH AND HIGH HEAT RESISTANCE, AND METHOD FOR PRODUCING THE POLYMER ELECTROLYTE BATTERY

BACKGROUND OF THE INVENTION (1) Field of the Invention

The present invention relates to a polymer electrolyte battery and more specifically to a polymer electrolyte battery containing a positive electrode and a negative electrode that sandwich a polyolefine porous membrane containing a gel polymer electrolyte.

(2) Description of the Related Art

Portable devices, such as a portable phone, an audio-video player, a digital camera, and a personal digital assistant, are now in increasing demand. In response to this demand, the need for a thin, light-weight battery with a high capacity rapidly increases. With its ultra thinness and light weight, a polymer electrolyte battery is suitable to be loaded in a portable device and expected to respond to the increasing need.

A polymer electrolyte battery contains a membrane made of a polymer electrolyte between a positive electrode plate and a negative electrode plate, and has an advantage of not causing a liquid electrolyte leak unlike other batteries using a liquid electrolyte.

A polymer electrolyte battery often uses a lithium complex oxide as a positive electrode active material. For a negative electrode material, lithium metal and an aluminum-lithium alloy have been conventionally used. With a battery using such negative electrode material, however, a dendrite is likely to grow as a result of the battery being repeatedly charged and discharged. Accordingly, a carbon material capable of lithium ion occlusion and release is now often used as a negative electrode material.

As a polymer electrolyte, a solid electrolyte containing a polyalkylene oxide in which a solute is dissolved is conventionally known. A containing alkylene oxide polymer, for instance, but has low ionic conductivity. This conventional solid electrolyte therefore has a drawback in that it has a small high rate discharge capacity.

To overcome this disadvantage, a polymer electrolyte battery containing a gel polymer electrolyte is developed. This gel polymer electrolyte contains a polymer that is produced by curing a polymer precursor such as polyalkylene glycol diacrylate. As the gel polymer electrolyte has higher ion conductivity than a solid electrolyte, a polymer electrolyte battery containing such gel polymer electrolyte can achieve a relatively high high-rate discharge capacity.

When this gel polymer electrolyte is included in a polyolefine porous membrane to be inserted between the positive electrode and the negative electrode, a polymer electrolyte battery having an improved mechanical strength can be developed.

For a thin-type polymer electrolyte battery, its external casing is usually formed by combining soft sheet members, such as laminated aluminum, together. As such external casing can be easily deformed (dent or bent) due to an external force, a thin-type polymer electrolyte battery is required to have a mechanical strength to maintain good battery performance even when a minor deformation occurs to the battery.

At the same time, as batteries are now used in a variety of types of apparatuses, they may be used at a very high temperature. Accordingly, a battery is also required to have a high heat resistance to prevent an internal short circuit from occurring at a high temperature.

For the above conventional polymer electrolyte battery which has a polyolefine porous membrane containing a gel polymer electrolyte, however, such internal short circuit is likely to occur at around 150° C. although the polymer electrolyte battery has a relatively high heat resistance. The above polyolefine porous membrane, which is usually used as a porous membrane, shrinks at a high temperature so that the positive electrode and the negative electrode become likely to be in contact with each other. This is considered to be the cause of an internal short circuit.

SUMMARY OF THE INVENTION

The present invention aims to provide a polymer electrolyte battery having a high discharge capacity, a high mechanical strength, and a high heat resistance.

To achieve this object, the present invention is applied to a polymer electrolyte battery including an electrode unit that contains a positive electrode plate and a negative electrode plate, into which a porous membrane containing a polymer electrolyte is inserted. Around the circumference of the electrode unit of the present battery, a polymer electrolyte material covers an edge part of the positive electrode plate and an edge part of the porous membrane together, and the edge part of the porous membrane and an edge part of the negative electrode plate together.

The porous membrane inserted between the positive electrode plate and the negative electrode plate allows the above polymer electrolyte battery to have a high mechanical strength.

The construction of the above polymer electrolyte battery also prevents a short circuit from occurring inside the polymer electrolyte battery due to the following reason.

At a high temperature around 150° C., an internal short circuit is likely to occur to a conventional polymer electrolyte battery that includes a polyolefine porous membrane containing a gel polymer electrolyte. This is because the polyolefine porous membrane, which is usually used as a porous membrane, shrinks and deforms due to a high temperature, so that the positive electrode plate and the negative electrode plate become likely to be in contact with one another.

For the polymer electrolyte battery of the present invention, however, a polymer electrolyte material connects an edge part of the porous membrane with an edge part of the positive electrode plate and with an edge part of the negative electrode plate. This is to say, the polymer electrolyte material holds edge parts of: the positive electrode plate; the negative electrode plate; and the porous membrane. This allows the porous membrane to keep its original shape against the contraction force, thereby preventing a short circuit from occurring inside the polymer electrolyte battery.

Here, it is preferable to use a polymer electrolyte of the same type for the above electrolyte material and for the polymer electrolyte that is contained in the porous membrane. This facilitates production process of the polymer electrolyte battery, and does not have any negative effect on battery performance.

For a polymer electrolyte battery that uses an external casing produced by combining sheet members together such as a laminated aluminum film, the external casing is likely to deform due to an external force, or swell due to an increase in an internal pressure when an internal short circuit occurs. Accordingly, providing a high mechanical strength and a high heat resistance to this type of polymer electrolyte battery has great practical importance.

The above polymer electrolyte battery can be easily produced through the following processes. The electrode unit is produced by inserting a porous membrane between a positive electrode plate and a negative electrode plate. The produced electrode unit is impregnated with a pregel solution composed of a liquid electrolyte and a polymer precursor. The pregel solution that is added into and affixed around the electrode unit is then cured.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENTS

Figure 1:
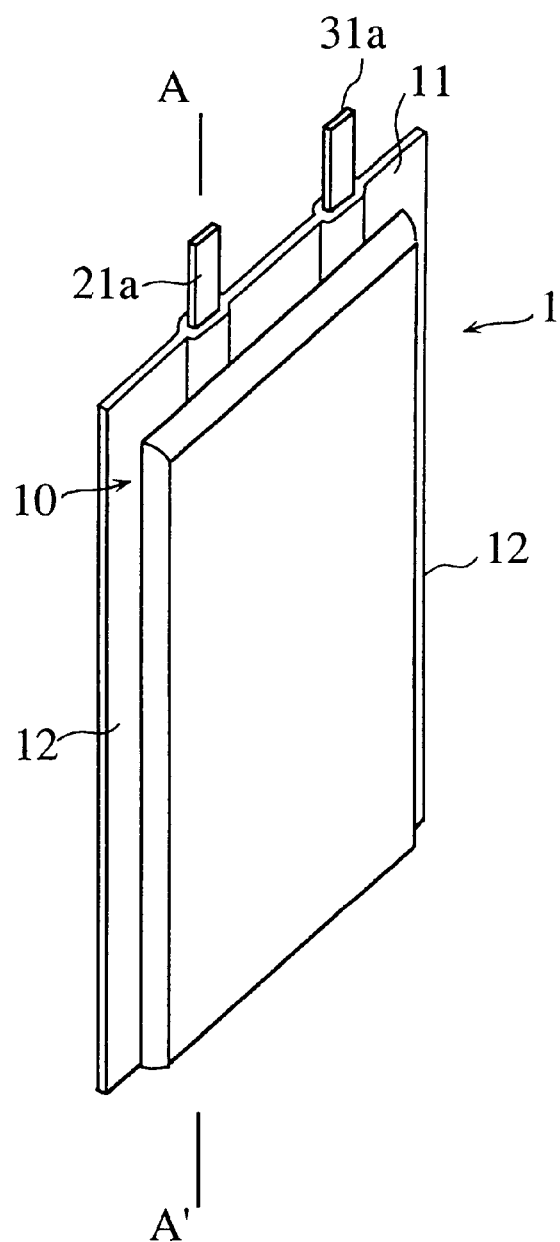
FIG. 1 shows an external appearance of a thin-type polymer electrolyte battery of one embodiment according to the present invention in perspective view.
Figure 2:
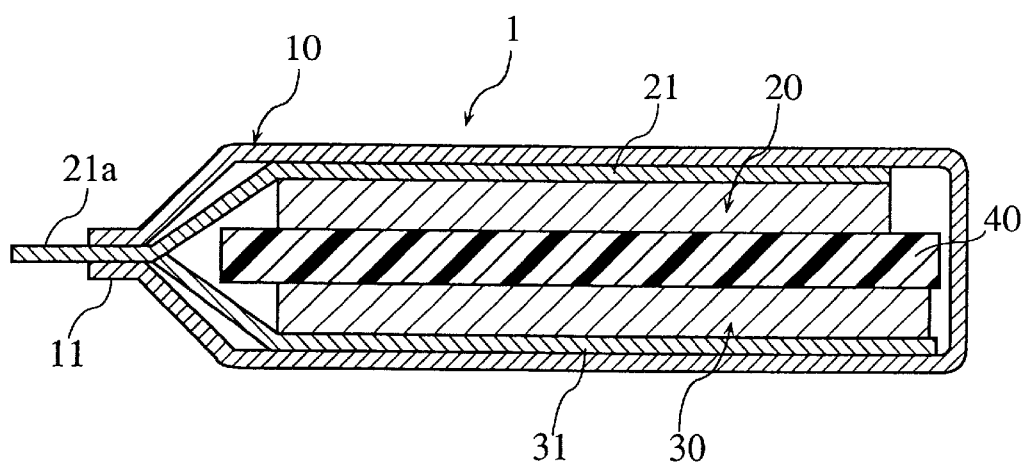
FIG. 2 is a section view taken on a line A–A' in FIG. 1.

FIG. 1 shows an external appearance of a thin-type polymer electrolyte battery of one embodiment in perspective view, and FIG. 2 is a section taken on the line A–A' in FIG. 1.

The present polymer electrolyte battery 1 comprises an external casing 10 enclosing an electrode unit as an electricity generating element. This electrode unit is of a rectangular shape and contains a positive electrode plate 20, a negative electrode plate 30, and a polyolefine porous membrane 40 that are layered together, with the porous membrane 40 between the plates 20 and 30. The external casing 10 is formed as an envelope-like shape by combining sheet members together. The porous membrane 40 is impregnated with a gel polymer electrolyte. This electrode unit also contains a positive electrode current collector 21 on the side of a surface of the positive electrode plate 20, and a negative electrode current collector 31 on the side of the negative electrode plate 30. A lead terminal 21a and a lead terminal 31a respectively extend from the positive electrode current collector 21 and the negative electrode current collector 31 outward through top edge parts 11 of the polymer electrolyte battery 1, and form external terminals.

The sheet members forming the external casing 10 are made of a laminated aluminum film (i.e., a film of aluminum foil covered by a PP layer or a PE layer). This laminated aluminum film is light and has a high tensile strength.

The positive electrode plate 20 is formed as a rectangular plate containing the following compounds that are mixed together: a lithium complex oxide as a positive active material such as $LiCoO_2$, $LiNiO_2$, $LiMnO_2$, and $LiFeO_2$; carbon powder as a conductive agent such as graphite powder and coke powder; and a binding agent.

The negative electrode plate 30 is formed as a rectangular plate containing carbon powder (graphite powder) as a negative electrode active material, and a binding agent that are mixed together.

The porous membrane 40 is made of a polyolefine porous film, and has a larger size than the positive electrode plate 20 and the negative electrode plate 30. Specifically, the porous membrane 40 extends a little longer than the positive electrode plate 20 and the negative electrode plate 30 to keep the positive electrode plate 20 and the negative electrode plate 30 from contact with one another. A polymer electrolyte is filled into a part, which is sandwiched by the positive electrode plate 20 and the negative electrode plate 30, of the porous membrane 40.

This polymer electrolyte is gel made by curing a polymer precursor to produce a polymer and then impregnating the produced polymer with a nonaqueous liquid electrolyte. The above polymer precursor may be polyalkylene glycol diacrylate (such as polyethylene glycol diacrylate and polypropylene glycol diacrylate) or polyalkylene glycol dimethacrylate (such as polyethylene glycol dimethacrylate and polypropylene glycol dimethacrylate). A solvent of the nonaqueous liquid electrolyte may be, for instance, an organic solvent such as ethylene carbonate and propylene carbonate, or a mixed solvent containing this organic solvent and a low boiling solvent, such as dimethyl carbonate, diethyl carbonate, 1,2-dimethoxyethane, 1,2-diethoxyethane, and ethoxy methoxy ethane. A solute of the nonaqueous liquid electrolyte may be $LiPF_6$, $LiClO_4$, or $LiCF_3SO_3$, for instance.

This polymer electrolyte is not only contained in the porous membrane 40 but also present so as to cover an edge part of the positive electrode plate 20 and that of the porous membrane 40 together, and an edge part of the porous membrane 40 and that of the negative electrode plate 30 together.

Detailed Explanation of Polymer Electrolyte Arrangement and Its Effects

Figure 3:
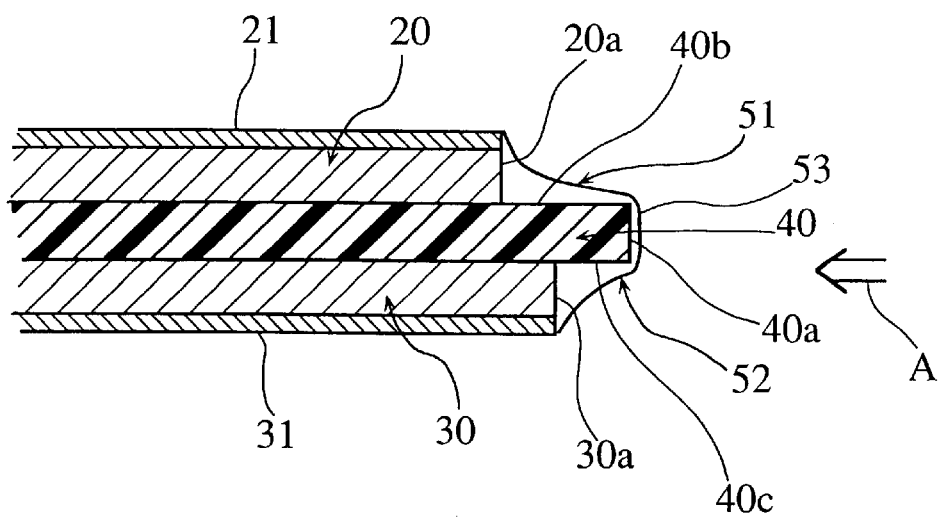
FIG. 3 is a partial section view of an electrode unit of the polymer electrolyte battery shown in FIG. 2.

FIG. 3 is a section view of the electrode unit of the polymer electrolyte battery 1 shown in FIG. 2.

As shown in the figure, a polymer electrolyte layer 51 is formed so as to cover an edge face 20a of the positive electrode plate 20 and a surface of an edge part 40b of the porous membrane 40. A polymer electrolyte layer 52 is formed so as to cover an edge face 30a of the negative electrode plate 30 and a surface of an edge part 40c of the porous membrane 40. Further, a polymer electrolyte layer 53 covers an edge face 40a of the porous membrane 40 in such a way that connects the polymer electrolyte layer 51 with the polymer electrolyte layer 52. The polymer electrolyte layers 51–53 are formed around the circumference of the electrode unit.

Arrangements of these polymer electrolyte layers 51–53 provide the following advantage to the polymer electrolyte battery 1.

When a temperature of the polymer electrolyte battery 1 rises as a result of the battery 1 being placed at a high temperature, a contraction force is exerted on the porous membrane 40 toward its center in the direction of an arrow "A". This contraction force has little effect on the part of the porous membrane 40 sandwiched by the positive electrode plate 20 and the negative electrode plate 30 since this part is supported by the positive electrode plate 20 and the negative electrode plate 30, and therefore the sandwiched part hardly shrinks. The above contraction force, however, would cause edge parts of the porous membrane 40 to shrink without the polymer electrolyte layers 51–53, so that the positive electrode plate 20 is likely to be in contact with the negative electrode plate 30.

When the above polymer electrolyte layers 51–53 are present, however, edge parts of the porous membrane 40 can be supported via these electrolyte layers 51–53 by the positive electrode plate 20 and the negative electrode plate 30. As a result, the edge parts hardly shrink when the above contraction force is exerted on these parts, and therefore the positive electrode plate 20 and the negative electrode plate 30 are not likely to be in contact with one another.

This effect can be obtained by only providing the polymer electrolyte layers 51 and 52, and the polymer electrolyte layer 53 is not necessary. The polymer electrolyte layer 53, however, guarantees the above effect being achieved more reliably.

It is preferable that each of the polymer electrolyte layers 51–53 surrounds the perimeter of the electrode unit although each of the electrolyte layers 51–53 may be formed in pieces around the circumference of the electrode unit. Such pieces of electrolyte layers 51–53 are capable of keeping the positive electrode plate 20 and the negative electrode plate 30 from contact with one another.

More specifically, each of the polymer electrolyte layers 51–53 may be formed in pieces which are positioned at intervals around the circumference of the electrode unit, or these pieces of layers may be positioned on only two facing sides out of the four sides of the electrode unit. Such arrangements of the electrolyte layers 51–53 can still keep the positive electrode plate 20 and the negative electrode plate 30 from contact with one another.

Method for Producing a Polymer Electrolyte Battery 1

The above polymer electrolyte battery 1 can be produced as follows.

1. Electrode Unit Production

The positive electrode current collector 21 and the negative electrode current collector 31 are produced by cutting conductive foil to a predetermined form.

The positive electrode plate 20 is produced by mixing the positive active material, the conductive agent, and the binding agent, and then applying the mixed substance onto a surface of the positive electrode current collector 21.

The negative electrode plate 30 is produced by mixing the negative electrode active material and the binding agent, and applying the mixed substance onto a surface of the negative electrode current collector 31.

The porous membrane 40 is produced by cutting a polyolefine porous film to a predetermined form.

The electrode unit is then produced by layering the positive electrode plate 20, the porous membrane 40, and the negative electrode plate 30 together.

2. Solution Impregnation and Curing

An impregnating solution is produced by adding the nonaqueous liquid electrolyte and a polymerization initiator to the polymer precursor that is either polyalkylene glycol diacrylate or polyalkylene glycol dimethacrylate. The above electrode unit is then impregnated with the produced impregnating solution, taken out of the impregnating solution, and heated so as to cure the impregnating solution adhered to the electrode unit.

By impregnation the whole electrode unit, instead of the porous membrane 40 alone, with the impregnating solution, not only the porous membrane 40 is filled with the solution, but also this solution is adhered to edge parts of the positive electrode plate 20, the negative electrode plate 30, and the porous membrane 40. When the impregnating solution adhered to these edge parts cures, the polymer electrolyte layers 51–53 are formed.

Instead of impregnating the electrode unit with the impregnating solution, it is possible to impregnate the porous membrane 40 alone with the impregnating solution as well as applying this solution to edge parts of: the positive electrode plate 20; the negative electrode plate 30; and the porous membrane 40 although impregnating the whole electrode unit can be performed more easily and ensure more reliable results.

3. External Casing Production

The external casing is produced using sheet members made of a laminated aluminum film, which enclose the above electrode unit. The sheet members are shaped into an envelop form. The top edge parts 11 are sealed, with the lead terminals 21a and 31a being inserted between these top edge parts 11.

With the above production method, the polymer electrolyte battery 1 including the polymer electrolyte layers 51–53 can be easily produced.

EXAMPLE MODIFICATIONS

In the above embodiment, the polymer electrolyte of the same type is used to be filled into the porous membrane 40 and to form the polymer electrolyte layers 51–53. However, different types of polymer electrolytes may be used for the porous membrane 40 and the polymer electrolyte layers 51–53, with this still ensuring the stated effect. Use of different types of electrolytes, however, may decrease battery performance, and therefore use of the same electrolyte is preferable. Also, the use of the same polymer electrolyte facilitates the battery production process.

With the above production method, the electrolyte unit is first generated by layering the positive electrode plate 20, the porous membrane 40, and the negative electrode plate 30 together, and this electrolyte unit is impregnated with the impregnating solution, which is cured. This process allows filling of the polymer electrolyte into the porous membrane 40, and forming of the polymer electrolyte layers 51–53 to be performed at the same time. Instead of performing this process, it is possible to impregnate the porous membrane 40 alone with the impregnating solution, take the porous membrane 40 out of the solution, insert this porous membrane 40 between the positive electrode plate 20 and the negative electrode plate 30 to produce the electrode unit. After this, edge parts of the produced electrode unit are impregnated with the impregnating solution, and the solution is cured. With this modification production method also, filling of the polymer electrolyte into the porous membrane 40 and forming of the polymer electrolyte layers 51–53 can be performed. This modification method allows different types of polymer electrolytes to be used for the polymer electrolyte layers 51–53 and the porous membrane 40.

Experiments

1. Battery of Above Embodiments

A polymer electrolyte battery with a battery capacity of 150 mAh was produced based on the above embodiments. This polymer electrolyte battery has the following specifications.

The positive electrode current collector 21 is made of aluminum foil, and the negative electrode current collector 31 is made of copper foil.

For the positive electrode plate 20, $LiCoO_2$ powder as the positive active material, graphite powder and carbon powder (e.g. KETJENBLACK) as the conductive agent, and PVdF powder as the binding agent are mixed at a weight ratio of 90:3:2:5 to produce a mixed substance. A slurry is formed by this mixed substance, and this slurry is applied to a surface of the positive electrode current collector 21. Vacuum heat treatment is then performed on this positive electrode current collector 21, so that the positive electrode plate 20 is produced. The produced positive electrode plate 20 is 52 $cm^2$ in area and 80 $\mu$m thick.

For the negative electrode plate 30, graphite powder as a negative electrode active material and fluororesin as a binding agent are mixed at a weight ratio of 95:5 to produce a mixed substance. A slurry is formed by this mixed substance, and the slurry is applied to a surface of the negative electrode current collector 31. Vacuum heat treatment is then performed on this negative electrode current collector 31 so that the negative electrode plate 30 is produced. The produced negative electrode plate 30 is 58 cm$^2$ in area and 65 $\mu$m thick.

The porous membrane 40 is achieved by a porous film made of polyethylene.

The electrode unit is produced by layering the positive electrode plate 20, the porous membrane 40, and the negative electrode plate 30 together.

Polypropylene glycol diacrylate with a molecular weight of "300" is used as a polymer precursor. For the nonaqueous liquid electrolyte, a mixed solute containing ethylene carbonate (EC) and diethyl carbonate (DEC) at a volume ratio of 5:5 is used. 1 mol/l (moles/litter) LiPF$_6$ is dissolved in this mixed solute so that the nonaqueous liquid electrolyte is formed. The above polymer precursor and the nonaqueous liquid electrolyte are mixed at a weight ratio of 1:10 to produce a mixed solution. 5,000 ppm t-hexylperoxy pivalate is added as a polymerization initiator to the mixed solution so that the impregnating solution is produced.

The electrode unit was impregnated with this impregnating solution to have the porous membrane 40 impregnated with the solution, taken out of the solution, and heated at 60° C. for three hours to cure the solution adhered to the electrode unit.

The laminated aluminum film which is aluminum foil covered by the PP layer or PE layer was folded in such a way that sandwiches the above electrode unit. The top edge parts 11 and side edge parts 12 were heated for sealing. When the top edge parts 11 were sealed, the lead terminals 21a and 31a remain to be inserted between the top edge parts 11. As a result, the external casing 10 was formed.

2. Comparison Example Battery

A comparison polymer electrolyte battery to be compared with the above battery of the present invention was produced as follows.

A positive electrode plate, a negative electrode plate, a porous membrane, and an impregnating solution were produced in the same way as used for the above battery of the present invention.

Only the porous membrane was impregnated with the impregnating solution, taken out of the solution, and heated at 60° C. for three hours to cure the impregnating solution contained in the porous membrane. As a result, the porous membrane filled with the polymer electrolyte was produced.

After this, the positive electrode plate, the porous membrane, and the negative electrode plate were layered to produce an electrode unit. An external casing was then produced by folding a laminated aluminum film in such a way that encloses the electrode unit.

This comparison polymer electrolyte battery is basically the same as the above polymer electrolyte battery of the present invention except that the comparison battery does not contain the polymer electrolyte layers 51–53.

3. Thermal Test

A number of polymer electrolyte batteries of the present invention and comparison batteries were produced, fully charged to 4.2 V, and then gradually heated to a temperature of 150° C. A ratio of batteries that exploded or ignited was obtained as follows.

For the comparison batteries, a ratio (hereafter, "an explosion/ignition ratio") of comparison batteries that exploded or ignited to all the comparison batteries is 20%. For the batteries of the present invention, the explosion/ignition ratio was 0%.

It is clear from this thermal test result that the polymer electrolyte layers 51–53 of the present invention enhance heat resistance of a battery.

Supplementary Explanation

The polymer electrolyte battery of the present invention may contain a lithium alloy as the negative electrode active material although the above embodiment uses a carbon material as the negative electrode active material.

The above embodiment states that the external casing is produced by combining sheet members together, such as a laminated aluminum film. However, the external casing used for the polymer electrolyte battery of the present invention may be achieved by a metal case.

The above embodiment describes the polymer electrolyte battery that has the external casing enclosing a single electrode unit containing the positive electrode plate, the negative electrode plate, an the porous membrane that are layered. The external casing, however, may contain a plurality of such electrode units which are bundled together. A polymer electrolyte battery containing such bundle of electrode units can provide the same effect as described above.

A form of the electrode unit is not limited to the above embodiment, and the electrode unit may be made of a positive electrode plate, a negative electrode plate, and a porous membrane that are in a strip form and are rolled together, with the porous membrane being inserted between the positive electrode plate and the negative electrode plate. With a polymer electrolyte battery that includes the external casing enclosing this electrode unit, the same effect as in the above embodiment can be obtained.

The above embodiments describe the present invention by using a polymer electrolyte lithium battery that uses a lithium complex oxide as the positive active material, and a carbonate material as the negative active material. The present invention, however, is not limited to such polymer electrolyte lithium battery, and may be applied to any polymer electrolyte battery including a negative electrode and a positive electrode that are arranged with a porous membrane containing a gel polymer electrolyte being inserted therebetween.

As has been described, the polymer electrolyte battery of the present invention includes the negative electrode and the positive electrode that are arranged so as to sandwich a porous membrane containing the gel polymer electrolyte. The polymer electrolyte layers are formed so as to cover an edge part of the positive electrode and that of the porous membrane together, and an edge part of the negative electrode and that of the porous membrane together. This construction can provide a high mechanical strength to the battery and prevent an internal short circuit from occurring at a high temperature.

The present invention is especially useful for a thin-type polymer electrolyte battery using an external casing produced by combining sheet members together, such as a laminated aluminum film.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A polymer electrolyte battery, comprising an electrode unit that includes a positive electrode plate, a negative electrode plate, and a porous membrane inserted between the two plates, wherein the porous membrane is filled with a first gel polymer electrolyte, wherein around a circumference of the electrode unit, a second gel polymer electrolyte covers an edge part of the positive electrode plate and an edge part of the porous membrane together, and the edge part of the porous membrane and an edge part of the negative electrode plate together.

2. The polymer electrolyte battery of claim 1, wherein the first gel polymer electrolyte is the same type as the second gel polymer electrolyte.

3. The polymer electrolyte battery of claim 2, wherein the first gel polymer electrolyte and the second gel polymer electrolyte are produced together by curing a pregel solution composed of a liquid electrolyte and a polymer precursor.

4. The polymer electrolyte battery of claim 3, wherein the polymer precursor is either polyalkylene glycol diacrylate or polyalkylene glycol dimethacrylate.

5. The polymer electrolyte battery of claim 3, wherein the porous membrane is a polyolefine porous film.

6. The polymer electrolyte battery of claim 1, wherein the second gel polymer electrolyte extends across the edge part of the positive electrode plate, the edge part of the porous membrane, and the edge part of the negative electrode plate.

7. The polymer electrolyte battery of claim 1, wherein the second gel polymer electrolyte is uniformly distributed around the circumference of the electrode unit.

8. The polymer electrolyte battery of claim 7, wherein the second gel polymer electrolyte forms a continuous layer around the circumference of the electrode unit.

9. The polymer electrolyte battery of claim 1, wherein the electrode unit is enclosed by an external casing made of at least one sheet member.

10. The polymer electrolyte battery of claim 9, wherein the at least one sheet member is a laminated aluminum film.

11. A method for producing a polymer electrolyte battery, including:

an electrode unit producing step for producing an electrode unit by inserting a porous membrane between a positive electrode plate and a negative electrode plate;

a pregel solution adding step for impregnating the produced electrode unit with a pregel solution and affixing the pregel solution around a circumference of the electrode unit, the pregel solution being composed of a liquid electrolyte and a polymer precursor; and a curing step for curing the pregel solution.

12. The method of claim 11, wherein in the pregel solution adding step, the electrode unit is soaked in the pregel solution.

* * * * *